United States Patent
Butikofer

(10) Patent No.: US 8,912,294 B2
(45) Date of Patent: Dec. 16, 2014

(54) POLYAMINE HAVING A REDUCED BLUSHING EFFECT, AND USE THEREOF AS A CURING AGENT FOR EPOXY RESINS

(75) Inventor: Pierre-Andre Butikofer, Wallisellen (CH)

(73) Assignee: Sika Technology AG, Baar (CH)

( * ) Notice: Subject to any disclaimer, the term of this patent is extended or adjusted under 35 U.S.C. 154(b) by 722 days.

(21) Appl. No.: 12/995,299

(22) PCT Filed: Jun. 12, 2009

(86) PCT No.: PCT/EP2009/057272
§ 371 (c)(1),
(2), (4) Date: Nov. 30, 2010

(87) PCT Pub. No.: WO2009/150219
PCT Pub. Date: Dec. 17, 2009

(65) Prior Publication Data
US 2011/0082248 A1    Apr. 7, 2011

(30) Foreign Application Priority Data
Jun. 13, 2008  (EP) ..................... 08158213

(51) Int. Cl.
*C08G 59/40*    (2006.01)
(52) U.S. Cl.
CPC ................. *C08G 59/4042* (2013.01)
USPC ............. 525/529; 564/502; 548/564; 528/87; 528/107; 528/117
(58) Field of Classification Search
USPC ............. 564/502; 548/564; 525/529; 528/87, 528/107, 117
See application file for complete search history.

(56) References Cited

U.S. PATENT DOCUMENTS

| 4,980,398 A | 12/1990 | Chung et al. |
| 5,194,142 A * | 3/1993 | Forester .................. 208/48 AA |
| 5,382,606 A | 1/1995 | Butikofer |

FOREIGN PATENT DOCUMENTS

| EP | 0 567 831 A1 | 11/1993 |
| JP | A 54-70211 | 6/1979 |
| WO | WO 02/062908 A2 | 8/2002 |

OTHER PUBLICATIONS

"General, Mild and Efficient Synthesis of β-Enaminones Catalyzed by Ceric Ammonium Nitrate" Vellaisamy Sridharan, Carmen Avendaño, J. Carlos Menéndez; Synlett 2007(6): 0881-0884 DOI: 10.1055/s-2007-973862; Apr. 2007 http://www.organic-chemistry.org/abstracts/lit1/632.shtm.*
Sep. 24, 2009 International Search Report issued in International Application No. PCT/EP2009/057272.

* cited by examiner

*Primary Examiner* — Peter D Mulcahy
(74) *Attorney, Agent, or Firm* — Oliff PLC

(57) ABSTRACT

Polyamines A1 of formula (I) or (II). They can be easily synthesized from readily available raw materials and have no primary amino groups or only a low content of primary amino groups and thus exhibit hardly any blushing. Their viscosity is relatively low, compared with polyamine/polyepoxide adducts of the polyamine on which polyamine A1 is based. Thus epoxy resin compositions can be formulated that are free of benzyl alcohol and free of blushing.

17 Claims, No Drawings

POLYAMINE HAVING A REDUCED BLUSHING EFFECT, AND USE THEREOF AS A CURING AGENT FOR EPOXY RESINS

TECHNICAL FIELD

The present invention relates to the field of amines and their use as curing agents for epoxy resins.

STATE OF THE ART

A wide variety of amines are used as curing agents for epoxy resins. Most of these amine curing agents mainly contain primary amino groups and thus have the great disadvantage that they form stable carbonate and carbamate salts with carbon dioxide from the air. Firstly, this means the curing agents cannot be stored exposed to air, or else they form crusts in the containers. Secondly, when the curing agents are used as coatings (after mixing into the epoxy resin and during curing), they also can take up $CO_2$ and consequently undesirable effects can appear such as an aesthetically unsatisfactory tacky surface with problems ranging from hazing or spotting to incomplete curing. These effects are called "blushing" by the person skilled in the art.

In order to moderate these disadvantages and to reduce the viscosity of the curing agents, such amine curing agents often contain large amounts of benzyl alcohol, which however has its own disadvantages, since on the one hand benzyl alcohol is a volatile organic compound (VOC) and so such compositions cannot be declared VOC-free, and on the other hand large amounts of benzyl alcohol definitely have a negative impact on the mechanical properties of the cured epoxy resin.

Polyamines with secondary amino groups, which are suitable as curing agents for epoxy resins, do not form, any stable carbonates with $CO_2$ and so in general do not lead to blushing, but these polyamines are difficult to obtain or their preparation is often very expensive.

One option often used to convert primary amino groups of amine curing agents to secondary amino groups is formation of adducts with polyepoxides. The adducts formed, however, usually have very high viscosity, which often makes dilution with solvents or benzyl alcohol necessary in order to achieve good workability, and thus again leads to VOC-containing compositions and the negative impact on the mechanical behavior and/or stability accompanying use of volatile solvents.

DESCRIPTION OF THE INVENTION

The aim of the present invention is to provide polyamines suitable as curing agents for epoxy resins, where these polyamines have no primary amino groups or at least a definitely reduced content of primary amino groups and a relatively low viscosity.

It has now surprisingly been discovered that this aim can be achieved by means of the polyamines as specified in claim 1. The polyamines can be synthesized from readily available raw materials in a reaction that is easy to carry out. In order to optimize the reactivity and inhibit blushing, depending on the application it can be advantageous if the polyamine has no primary amino groups or only a low content of primary amino groups. This can be simply achieved by the stoichiometry selected in the synthesis. The polyamines according to the invention are distinguished by low viscosity, which makes it possible to realize VOC-free curing agents or epoxy resin compositions.

Further advantageous embodiments of the invention are the subject matter of the other independent and dependent claims.

EMBODIMENTS OF THE INVENTION

The present invention in a first aspect relates to a polyamine A1 of formula (I) or (II).

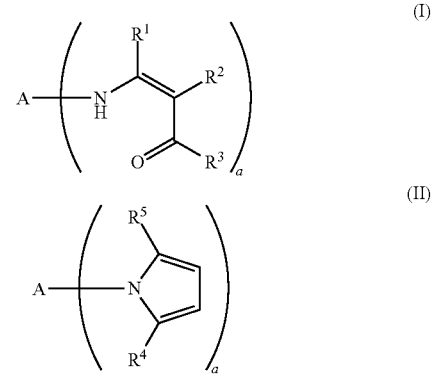

Here a stands for an integer from 1 to 100.
Furthermore, A stands for an a-valent radical of a polyamine B1 after removal of a primary amino groups, where this radical has at least 3 amino groups in the form of secondary or primary amino groups and where the number of the secondary amino groups is greater than the number of the primary amino groups.

Furthermore,
either
  $R^1$ and $R^3$ each independently stand for an alkyl, cycloalkyl, aryl, or arylalkyl group with 1 to 12 C atoms which optionally has ether groups or halogen atoms, and $R^2$ stands for a hydrogen atom or for an alkyl, cycloalkyl, aryl, or arylalkyl group with 1 to 12 C atoms,
or
  $R^2$ and $R^1$ together stand for a divalent hydrocarbon radical that is part of an optionally substituted carbocyclic ring with 5 to 8 C atoms, preferably 5 or 6 C atoms, and $R^3$ stands for an alkyl, cycloalkyl, aryl, or arylalkyl group with 1 to 12 C atoms which optionally has ether groups or halogen atoms;
or
  $R^2$ and $R^3$ together stand for a divalent hydrocarbon radical that is part of an optionally substituted carbocyclic ring with 5 to 8 C atoms, preferably 5 or 6 C atoms, and $R^1$ stands for an alkyl, cycloalkyl, aryl, or arylalkyl group with 1 to 12 C atoms which optionally has ether groups or halogen atoms.

Finally, $R^4$ and $R^5$ each independently stand for an alkyl, cycloalkyl, aryl, or arylalkyl group with 1 to 12 C atoms which optionally has ether groups or halogen atoms.

In this document, the term "polyamine" means compounds with at least two primary or secondary amino groups.

In this document, "primary" amino group means an $NH_2$ group that is bonded to an organic radical, and "secondary" amino group means an NH group that is bonded to two organic radicals, which can also together be part of a ring.

The acyl enamino groups of formula (i) are in equilibrium with the tautomeric isomers of formula (ii) and formula (iii). Every time the acyl enamino groups of formula (i) are mentioned, in each case the tautomers of formula (ii) and formula (iii) are also meant even if this is not expressly mentioned.

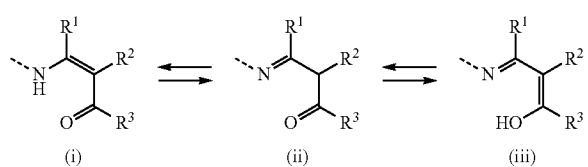

The dashed lines in the formulas in this document in each case represent bonding between a substituent and the respective molecular moiety.

In this document, the boldface designations such as A1, B1, B2, K1, K2, C1, C11, C2, C22 or the like are used only for easier reading and identification.

$R^1$ and $R^3$ preferably each stand for a methyl group.

$R^2$ preferably stands for a hydrogen atom.

$R^4$ and $R^5$ preferably each stand for a methyl group.

The letter a preferably stands for an integer from 2 to 100.

The letter a preferably stands for an integer from 1 to 10.

The letter a especially preferably stands for an integer from 2 to 10.

It is preferable that a have a value of 2 or greater, because such polyamines A1 of formula (I) are distinguished by no or at least considerably reduced blushing.

Preferably A stands for the a-valent radical of a polyamine B1 after removal of a primary amino groups, where the polyamine B1 is selected from the group consisting of triethylenetetramine (TETA), tetraethylenepentamine (TEPA), pentaethylenehexamine (PEHA), polyethylene polyamine with 5 to 7 ethyleneamine units ("higher ethylene polyamine", HEPA), N,N'-bis(3-aminopropyl)ethylenediamine and polyethyleneimine (PEI) with an average molecular weight of 500 to 2500 g/mol.

Especially preferably, A stands for the a-valent radical of a polyamine B1 after removal of a primary amino groups, where the polyamine B1 is selected from the group consisting of tetraethylenepentamine (TEPA), pentaethylenehexamine (PEHA), polyethylene polyamine with 5 to 7 ethyleneamine units ("higher ethylene polyamine", HEPA), and polyethyleneimine (PEI) with an average molecular weight of 500 to 2500 g/mol.

A further subject matter of the invention is a method for preparation of a polyamine A1 of formula (I) or (II), where at least one polyamine B1 of formula (III) is reacted with at least one diketone K1 of formula (IV) or a diketone K2 of formula (V), where the diketone K1 or K2 is used in stoichiometric or substoichiometric ratio relative to the primary amino groups of the polyamine.

$$A\!-\!\!(\!NH_2)_a \qquad \text{(III)}$$

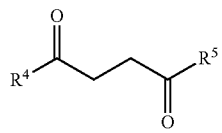

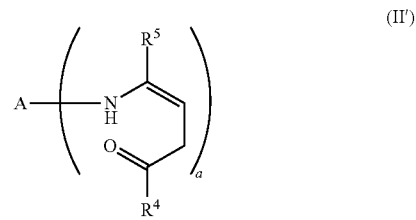

In formulas (III), (IV), and (V), the symbols A, a, $R^1$, $R^2$, $R^3$, $R^4$, and $R^5$ have the already indicated meanings.

The respective diketone reacts with the primary amino groups of polyamine B1 of formula (III), with elimination of water.

In the case of diketone K1 of formula (IV) (a β-diketone, also called a 1,3-diketone), a polyamine A1 of formula (I) is formed, where one mole of water is liberated per mole of reacted diketone K1. This reaction occurs very rapidly and approximately quantitatively. It is preferably carried out at a temperature in the range from 20° C. to 120° C.

In the case of diketone K2 of formula (V) (a γ-diketone, also called a 1,4-diketone), a polyamine A1 of formula (II) is formed, where two moles of water are liberated per mole of reacted diketone K2. This reaction is also known by the name "Paal-Knorr pyrrole synthesis." In formation of polyamine A1 of formula (II), the acyclic form, as shown in formula (II'), appears as an intermediate (or byproduct).

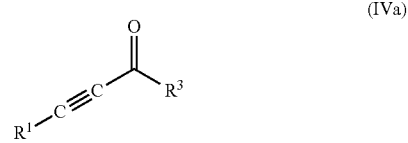

In formula (II'), the symbols $R^4$, $R^5$, A, and a have the already indicated meanings.

Cyclization to form the pyrrole group (condensation reaction) mainly occurs if the reaction mixture is stirred, for example, for a few hours at elevated temperature such as, for example, 60° C. to 120° C.

It is also possible to prepare a polyamine A1 of formula (I) by using a ketone of formula (IV a) instead of a diketone K1 of formula (IV). Here at least one polyamine B1 of formula (III) is reacted with at least one ketone of formula (IV a), where the ketone of formula (IV a) is used in stoichiometric or substoichiometric ratio relative to the primary amino groups of the polyamine. In this case, alkylation of the primary amino groups occurs without elimination of water.

(IVa)

In formula (IV a), the symbols $R^1$ and $R^3$ have the meaning already described.

A suitable polyamine B1 has at least one primary amino group plus at least 3 amino groups in the form of primary or secondary amino groups. The following polyamines are particularly suitable as polyamine B1:

aliphatic polyamines having two primary and at least two secondary amino groups, for example, "polyalkyleneamines" such as triethylenetetramine (TETA), tetraethylenepentamine (TEPA), pentaethylenehexamine (PEHA), polyethylene polyamine with 5 to 7 ethyleneamine units ("higher ethylene polyamine", HEPA), and N,N'-bis(3-aminopropyl)ethylenediamine. Such polyalkyleneamines are synthesized, for example, from 1,2-dichloroethane and ammonia, or from cyanoethylation or cyanobutylation and then hydrogenation of primary polyamines.

"Polyethyleneimines" (PEI); these are branched polymeric amines derived from polymerization of ethyleneimine. A suitable polyethyleneimine typically has an average molecular weight in the range from 250 to 25000 g/mol, and contains tertiary, secondary, and primary amino groups. Polyethyleneimines can be obtained, for example, under the trade name Lupasol® from BASF, for example, as Lupasol® FG, Lupasol® G20, and Lupasol® PR 8515.

Preferred polyamines B1 are selected from the group consisting of TETA, TEPA, PEHA, HEPA, N,N'-bis(3-aminopropyl)ethylenediamine, and polyethyleneimine (PEI) with an average molecular weight from 500 to 2500 g/mol.

Especially preferred polyamines B1 are selected from the group consisting of TEPA, PEHA, HEPA, and polyethyleneimine (PEI) with an average molecular weight from 500 to 2500 g/mol.

Suitable diketones K1 of formula (IV) are in particular 2,4-pentanedione (=acetylacetone), 2,4-pentanedione alkylated in the 3 position, thus in particular 3-methyl-, 3-ethyl-, 3-propyl-, 3-isopropyl-, 3-butyl-, 3-tert-butyl-, 3-cyclohexyl-, and 3-phenyl-2,4-pentanedione, 1,1,1-trifluoro-2,4-pentanedione, 1,1,1,5,5,5-hexafluoro-2,4-pentanedione, 3,5-heptanedione, 3,5-octanedione, 2,4-octanedione, 6-methyl-3,5-heptanedione, 2,2,6,6-tetramethyl-3,5-heptanedione, 2,2,4,6,6-pentamethyl-3,5-heptanedione, 1-phenyl-1,3-butanedione, 2-acetylcyclopentanone, 2-acetylcyclohexanone, 2-benzoylcyclopentanone, and 2-benzoylcyclohexanone.

Preferred diketones K1 are selected from the group consisting of 2,4-pentanedione, 3-methyl-, 3-ethyl-, 3-propyl-, 3-isopropyl-, 3-butyl-, 3-tert-butyl-, 3-cyclohexyl-, and 3-phenyl-2,4-pentanedione, 3,5-heptanedione, 6-methyl-3,5-heptanedione, 2,2,6,6-tetramethyl-3,5-heptanedione, 2,2,4,6,6-pentamethyl-3,5-heptanedione, 2-acetylcyclopentanone, and 2-acetylcyclohexanone.

2,4-Pentanedione is especially preferred as diketone K1.

Suitable diketones K2 of formula (V) are in particular 2,5-hexanedione (=acetonylacetone), 3,4-dimethyl-2,5-hexanedione, 1,2-dibenzoylethane, 1,4-bis(2-furyl)-1,4-butanedione, and 2-(2-oxopropyl)cyclopentanone. 2,5-Hexanedione is preferred as diketone K2.

A polyamine A1 of formula (I) or (II) can be synthesized in a simple process from readily available raw materials. It has at least 3 amino groups that can react with epoxy groups. The number of secondary amino groups is greater than the number of primary amino groups. Polyamine A1 is thus quite suitable as a curing agent, in particular as a curing agent for epoxy resins.

Polyamine A1 furthermore has no primary amino groups or only a low content of primary amino groups, in particular compared with the corresponding polyamine B1 on which polyamine A1 is based. Low content of primary amino groups at the same time means high $NH_2$-equivalent weight. Thus polyamine A1 hardly reacts or does not react at all with carbon dioxide from the air, and therefore forms little or no carbonate and/or carbamate salts. The absence of such salt formation is very advantageous in particular when using polyamine A1 as a curing agent for epoxy resins in a coating application, since therefore no salt-related optical and/or mechanical defects can occur during curing of the epoxy resin, such as in particular the film hazing known as blushing. On the other hand, the polyamine A1 has at least three amino groups that can react with epoxy groups and thus a number of epoxy group-reactive functional groups ("functionality") of at least 3, which is necessary for a curing agent for epoxy resins since as a result crosslinking occurs during curing, while for a functionality of 2 only chain extension occurs, and even chain termination occurs for a functionality of 1. A polyamine not corresponding to the present invention would therefore be, for example, the reaction product of triethylenetetramine (TETA) and a diketone K1 or K2 in 1:2 mole ratio. This polyamine reacted in this way has no primary amino groups and only two secondary amino groups, and thus has a functionality of 2 and, as a curing agent for epoxy resins, would only result in chain extension, which would lead to films of unacceptable quality.

The acyl enamino groups of formula (I) derived from reaction of polyamine A1 with diketone K1 of formula (IV) (or the pyrrole groups from reaction with diketone K2 of formula (V)) are storage-stable, even in the presence of water and at elevated temperature, such as for example at 60° C. Even in the presence of moisture, they do not react with epoxy groups to an appreciable extent, despite the enamine nitrogen of the acyl enamino group; the latter represents a vinylogous amido group in which the hydrogen atom on the enamine nitrogen can enter into a stable intramolecular hydrogen bonds with the carbonyl oxygen.

Prior-art curing agents for epoxy resins, which contain a large number of primary amino groups, are often mixed with considerable amounts of diluents, in particular benzyl alcohol. Benzyl alcohol also reduces blushing in film formation with epoxy resins. A higher benzyl alcohol content, however, can also cause problems, for example by reducing the hardness of the cured film to an undesirable extent. In addition, benzyl alcohol is a volatile organic compound (VOC). Using the polyamine A1 as a curing agent for epoxy resins makes possible compositions which have a greatly reduced benzyl alcohol content or are entirely free of benzyl alcohol, since polyamine A1 contains only a few or no primary amino groups and therefore there are hardly any problems with blushing, and since polyamine A1 has relatively low viscosity. Polyamine A1 has a definitely lower viscosity than an adduct derived from the corresponding polyamine B1 and a polyepoxide. In particular, polyamines A1 are definitely less viscous than the corresponding adducts between the polyamine B1 on which polyamine A1 is based and a bisphenol A epoxy resin. Such adducts can be easily handled only if solvents or diluents are added.

Polyamine A1 of formula (I) or (II) can be used as a reactant for substances which have NH-group reactive groups such as, for example, isocyanate, isothiocyanate, cyclocarbonate, epoxy, episulfide, aziridine, acryl, methacryl, 1-eithinylcarbonyl, 1-propinylcarbonyl, maleimide, citraconimide, vinyl, isopropenyl, and allyl groups. Polyamine A1 can be advantageously used as a curing agent for substances having at least two of the aforementioned reactive groups, in particular as curing agents for polyisocyanates and polyepoxides. Polyamine A1 is especially suitable as a curing agent for epoxy resins. Polyamine A1 can also be used as a component of a mixture which additionally contains substances suitable as curing agents for epoxy resins.

A further subject matter of the present invention is a curing agent composition containing (a) at least one polyamine A1 of formula (I) or (II), such as has been described above,
(b) at least one polyamine B2 with at least two amino groups in the form of primary or secondary amino groups.

The following polyamines are particularly suitable as polyamine B2:

- aliphatic, cycloaliphatic, or arylaliphatic primary diamines, for example, ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3-, and 1,4-diaminocyclohexane, bis(4-aminocyclohexyl)methane ($H_{12}$-MDA), bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis(aminomethyl)cyclohexane, 2,5(2,6)-bis(aminomethyl)bicyclo[2.2.1]heptane (NBDA), 3(4),8(9)-bis(aminomethyl)tricyclo[$5.2.1.0^{2,6}$]decane, 1,4-diamino-2,2,6-trimethylcyclohexane (TMCDA), 1,8-menthanediamine, 3,9-bis(3-aminopropyl)-2,4,8,10-tetraoxaspiro[5.5]undecane, as well as 1,3- and 1,4-xylylenediamine;
- ether group-containing aliphatic primary diamines, for example, bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine and higher oligomers of these diamines, bis(3-aminopropyl)polytetrahydrofurans and other polytetrahydrofuran diamines with molecular weights in the range, for example, from 350 to 5200, as well as polyoxyalkylene diamines. The latter are typically amination products of polyoxyalkylene diols and can be obtained, for example, under the name Jeffamine® (from Huntsman), under the name polyetheramine (from BASF), or under the name PC Amine® (from Nitroil). Particularly suitable polyoxyalkylene diamines are Jeffamine® D-230, Jeffamine® D-400, Jeffamine® D-2000, Jeffamine® D-4000, Jeffamine® XTJ-511, Jeffamine® ED-600, Jeffamine ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramine D 230, Polyetheramine D 400 and Polyetheramine D 2000, PC Amine® DA 250, PC Amine® DA 400, PC Amine® DA 650, and PC Amine® DA 2000;
- aliphatic, cycloaliphatic, or arylaliphatic primary triamines such as 4-aminomethyl-1,8-octanediamine, 1,3,5-tris(aminomethyl)benzene, 1,3,5-tris(aminomethyl)cyclohexane, tris(2-aminoethyl)amine, tris(2-aminopropyl)amine, tris(3-aminopropyl)amine;
- primary polyoxyalkylene triamines, which typically are amination products of polyoxyalkylene triols and can be obtained, for example, under the trade name Jeffamine® (from Huntsman), under the name polyetheramine (from BASF), or under the name PC Amine® (from Nitroil), such as, for example, Jeffamine® T-403, Jeffamine® T-3000, Jeffamine® T-5000; Polyetheramine T403, Polyetheramine T5000; and PC Amine® TA 403, PC Amine® TA 5000;
- polyamines having secondary and primary amino groups, for example, diethylenetriamine (DETA), dipropylenetriamine (DPTA), bis(hexamethylene)triamine (BHMT), 3-(2-aminoethyl)aminopropylamine, N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine; as well as in addition the polyamines already mentioned as suitable polyamines B1;
- polyamines having tertiary amino groups such as, for example, N,N'-bis(aminopropyl)piperazine, N,N-bis(3-aminopropyl)methylamine, N,N-bis(3-aminopropyl)ethylamine, N,N-bis(3-aminopropyl)propylamine, N,N-bis(3-aminopropyl)cyclohexylamine, N,N-bis(3-aminopropyl)-2-ethylhexylamine, as well as products of double cyanoethylation and subsequent reduction of fatty amines which are derived from natural fatty acids, such as N,N-bis(3-aminopropyl)dodecylamine and N,N-bis(3-aminopropyl)tallow alkylamine, which can be obtained as Triameen® Y12D and Triameen® YT (from Akzo Nobel);
- polyamines having secondary amino groups such as, for example, N,N'-dibutylethylenediamine; N,N'-di(tert-butyl)ethylenediamine, N,N'-diethyl-1,6-hexanediamine, 1-[(1-methylethyl)amino]-3-[(1-methylethyl)aminomethyl)]-3,5,5-trimethylcyclohexane (Jefflink® 754 from Huntsman), N4-cyclohexyl-2-methyl-N2-(2-methylpropyl)-2,4-pentanediamine, N,N'-dialkyl-1,3-xylylenediamine, bis[4-(N-alkylamino)cyclohexyl]methane, 4,4'-trimethylene dipiperidine, N-alkylated polyetheramines, for example Jeffamine® types SD-231, SD-401, SD-404, and SD-2001 (from Huntsman);
- also "polyamidoamines." Polyamidoamine means the reaction product between a monocarboxylic acid or a polycarboxylic acid, or esters or anhydrides thereof, and an aliphatic, cycloaliphatic, or aromatic polyamine, where the polyamine is used in stoichiometric excess. Usually a "dimer fatty acid" is used as the polycarboxylic acid, and usually a polyalkyleneamine such as, for example, TETA, is used as the polyamine. Commercially available polyamidoamines are, for example, Versamid® 100, 125, 140, and 150 (from Cognis), Aradur® 223, 250, and 848 (from Huntsman), Euretek® 3607, Euretek® 530 (from Huntsman), Beckopox® EH 651, EH 654, EH 655, EH 661, and EH 663 (from Cytec).

The polyamine B2 is preferably selected from the group consisting of 1,5-diamino-2-methylpentane (MPMD), 2-butyl-2-ethyl-1,5-pentanediamine (C11-neodiamine), 2,2,4- and 2,4,4-trimethylhexamethylenediamine (TMD), bis(4-amino-3-methylcyclohexyl)methane, 1-amino-3-aminomethyl-3,5,5-trimethylcyclohexane (=isophoronediamine or IPDA), 1,3-bis(aminomethyl)cyclohexane, 3(4),8(9)-bis(aminomethyl)ticyclo[$5.2.1.0^{2,6}$]decane, 1,3-xylylenediamine, diethylenetriamine (DETA), dipropylenetriamine (DPTA), and an ether group-containing diamine derived from amination of a polyoxyalkylene dial with a molecular weight from 500 to 5000 g/mol, in particular Jeffamine® D-230 and Jeffamine® D-400.

The curing agent composition can additionally contain amine/polyepoxide adducts. In particular, a polyamine B1 or a polyamine B2 can be partially reacted with a polyepoxide to form an adduct, where the reaction is carried out in such a way that the primary and secondary amino groups of the polyamine are present in stoichiometric excess compared with the epoxy groups of the polyepoxide.

In this document, the term "polyepoxide" means compounds with at least two epoxy groups. "Diepoxide" means compounds with two epoxy groups.

In this document, "epoxide group" or "epoxy group" means the structural element show below:

Diepoxides are particularly suitable as the polyepoxide for preparation of such an adduct, in particular diglycidyl ethers of aromatic diols such as, for example, bisphenol A, bisphenol F, or bisphenol A/F liquid resins.

A polyamine A1 of formula (I) or (II), or a curing agent composition such as has been described above, is advantageously used as a component of an epoxy resin composition, where the polyamine A1 acts as the curing agent for at least one epoxy resin.

A further subject matter of the present invention is therefore a two-component epoxy resin composition, consisting of a curing agent component C1 and a resin component C2.

The two-component epoxy resin composition can in particular be used as an adhesive, sealing compound, potting compound, coating, floor covering, paint, lacquer, primer or priming coat, preferably as a coating, in particular as a floor coating.

The curing agent component C1 contains at least one polyamine A1 of formula (I) or (II), optionally in the form of one of the described curing agent compositions.

The resin component C2 contains at least one epoxy resin.

Epoxy resins conventionally used in epoxy chemistry are thus suitable as the epoxy resin. These are obtained by methods known in the prior art, for example from oxidation of the corresponding olefins or from reaction of epichlorohydrin with the corresponding polyols, polyphenols, or amines.

Especially suitable epoxy resins are "liquid polyepoxy resins", called "liquid resins" in the following. These have a glass transition temperature which usually is below 25° C., in contrast to "solid resins" which have a glass transition temperature above 25° C. and can be broken up into free-flowing powders at 25° C.

In one embodiment, the liquid resin is an aromatic polyepoxide. For example, liquid resins of formula (VI) are suitable for this purpose:

for a number from 0 to 1. Preferred liquid resins of formula (VI) are those in which the subscript s on average stands for a number less than 0.2.

Liquid resins of formula (VI) include diglycidyl ethers of bisphenol A, bisphenol F, and bisphenol A/F, where A stands for acetone and F stands for formaldehyde, which are used as starting materials for manufacture of these bisphenols. A liquid bisphenol A resin accordingly has methyl groups, a liquid bisphenol F resin has hydrogen atoms, and a liquid bisphenol A/F resin has both methyl groups and hydrogen atoms as R' and R" in formula (VI). In the case of bisphenol F, positional isomers can also be present, in particular those derived from 2,4'- and 2,2'-hydroxyphenylmethane.

Further suitable aromatic liquid resins are the glycidylization products of dihydroxybenzene derivatives such as resorcinol, hydroquinone, and pyrocatechol;

other bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z),1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene) (bisphenol P), 1,3-bis[2-(4-hydroxyphenyl)-2-propyl]benzene) (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl)ether, bis(4-hydroxyphenyl)sulfone;

condensation products of phenols and formaldehyde that are obtained under acid conditions, such as phenol novolacs or cresol novolacs;

aromatic amines such as aniline, toluidine, 4-aminophenol, 4,4'-methylenediphenyldiamine (MDA), 4,4'-methylenediphenyldi(N-methyl)amine, 4,4'-[(1,4-phenylene)-bis(1-methylethylidene)]bisaniline (bisaniline P), 4,4'-[(1,3-phenylene)bis(1-methylethylidene)]bisaniline (bisaniline M).

Suitable epoxy resins are also an aliphatic or cycloaliphatic polyepoxide such as, for example

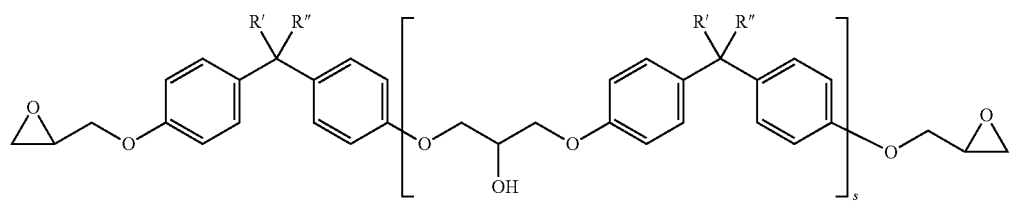

(VI)

where R' and R" each independently stand either for a hydrogen atom or for a methyl group, and s on average stands a glycidyl ether of a saturated or unsaturated, branched or unbranched, cyclic or open-chain $C_2$ to $C_{30}$ diol such as, for example, ethylene glycol, propylene glycol, butylene glycol, hexanediol, octanediol, a polypropylene glycol, dimethylolcyclohexane, neopentyl glycol, dibromoneopentyl glycol.

a glycidyl ether of a trifunctional or tetrafunctional, saturated or unsaturated, branched or unbranched, cyclic or open-chain polyol such as castor oil, trimethylolpropane, trimethylolethane, pentaerythritol, sorbitol or glycerol, as well as alkoxylated glycerol or alkoxylated trimethylolpropane;

an hydrogenated bisphenol A, F, or A/F liquid resin, or the glycidylization product of hydrogenated bisphenol A, F, or A/F;

an N-glycidyl derivative of amides or heterocyclic nitrogen bases such as triglycidyl cyanurate and triglycidyl isocyanurate, as well as reaction products between epichlorohydrin and hydantoin.

Suitable epoxy resins are also a bisphenol A, F, or A/F solid resin, which are prepared similarly to the already mentioned liquid resins of formula (VI) except the subscript s has a value of 2 to 12 and in addition they have a glass transition temperature above 25° C.

Finally, suitable epoxy resins are also epoxy resins derived from oxidation of olefins, for example from oxidation of vinylcyclohexene, dicyclopentadiene, cyclohexadiene, cyclododecadiene, cyclododecatriene, isoprene, 1,5-hexadiene, butadiene, polybutadiene, or divinylbenzene.

Preferred epoxy resins are solid or liquid bisphenol A, F, or A/F resins, such as are commercially available, for example, from Dow, Huntsman, and Hexion.

The epoxy resin can contain a "reactive diluent." Suitable reactive diluents are mono- and polyepoxides such as, for example, glycidyl ethers of monohydric or polyhydric phenols and aliphatic or cycloaliphatic alcohols, such as in particular the already mentioned polyglycidyl ethers of diols or polyols, as well as also in particular phenyl glycidyl ether, cresyl glycidyl ether, p-n-butyl phenyl glycidyl ether, p-tert-butyl phenyl glycidyl ether, nonylphenyl glycidyl ether, allyl glycidyl ether, butyl glycidyl ether, hexyl glycidyl ether, 2-ethylhexyl glycidyl ether, as well as glycidyl ethers of natural alcohols such as, for example, $C_8$ to $C_{10}$ alkyl glycidyl ethers or $C_{12}$ to $C_{14}$ alkyl glycidyl ethers. Adding a reactive diluent to the epoxy resin results in reduced viscosity as well as (in the cured state of the epoxy resin composition) a lowered glass transition temperature and reduced mechanical properties.

A polyamine A1 of formula (I) or (II) can also be produced by means of an in-situ method in a two-component epoxy resin composition, where the polyamine B1 on which polyamine A1 is based first comes into contact with diketone K1 of formula (IV) or a diketone K2 of formula (V) on mixing with the epoxy resin. Thus the corresponding polyamine A1 of formula (I) or (II) is formed in situ, i.e., directly in the epoxy resin.

A further subject matter of the present invention is therefore a two-component epoxy resin composition, consisting of a curing agent component C11 and a resin component C22, which can be used in the same way as the already described epoxy resin composition.

The curing agent component C11 contains at least one polyamine B1 of formula (III).

The resin component C22 contains, besides at least one epoxy resin as has been described above, additionally at least one diketone K1 of formula (IV) or a diketone K2 of formula (V), where the diketone is present in stoichiometric or substoichiometric ratio relative to the primary amino groups of polyamine B1, so when both components are mixed then at least one polyamine A1 of formula (I) or (II) is formed.

Both the curing agent component C1 or C11, and the resin component C2 or C22, can contain other aids and additives such as, for example:

unreactive diluents, solvents, or film-forming aids such as toluene, xylene, methyl ethyl ketone, 2-ethoxyethanol, 2-ethoxyethyl acetate or benzyl alcohol, ethylene glycol, diethylene glycol butyl ether, dipropylene glycol butyl ether, ethylene glycol butyl ether, ethylene glycol phenyl ether, N-methylpyrrolidone, propylene glycol butyl ether, propylene glycol phenyl ether, bisphenols and phenol resins, diphenylmethane, diisopropylnaphthalene, petroleum fractions such as, for example, Solvesso types (from Exxon), aromatic hydrocarbon resins, sebacates, phthalates, organic phosphoric and sulfonic acid esters and sulfonamides;

reactive diluents and extenders, for example epoxy group-containing reactive diluents such as have already been mentioned above, epoxidized soybean oil, butyrolactone, triphenyl phosphite, and also polyamides, polymers with carboxyl groups, isocyanates, reactive group-containing silicones, polysulfides, butadiene/acrylonitrile copolymers, and polyurethanes;

polymers such as, for example, polyamides, polysulfides, polyvinyl formal (PVF), polyvinyl butyral (PVB), polyurethanes (PUR), styrene/butadiene copolymers, homopolymers or copolymers of unsaturated monomers, in particular from the group including ethylene, propylene, butylene, isobutylene, isoprene, vinyl acetate, and alkyl (meth)acrylate, in particular chlorosulfonated polyethylenes and fluorine-containing polymers, sulfonamide-modified melamines;

thermoplastic polymers such as polyethersulfone, polyetherimide, and bitumen;

inorganic and organic fillers, for example, ground or precipitated calcium carbonates which are optionally coated with fatty acids, in particular stearates, baryte (heavy spar), talcs, quartz powders, quartz sand, dolomites, wollastonites, kaolins, mica (potassium aluminum silicate), molecular sieves, aluminum oxides, aluminum hydroxides, silicic acids, cements, gypsums, fly ash, carbon black, graphite, metal powders such as aluminum, copper, iron, silver, or steel, PVC powder, or hollow spheres;

fibers, for example plastic or glass fibers;

pigments, for example, titanium dioxide or iron oxides;

accelerators which accelerate the reaction between amino groups and epoxy groups, for example, acids or compounds that can be hydrolyzed to form acids, for example organic carboxylic acids such as acetic acid, benzoic acid, salicylic acid, 2-nitrobenzoic acid, lactic acid, organic sulfonic acids such as methanesulfonic acid, p-toluenesulfonic acid, or 4-dodecylbenzenesulfonic acid, sulfonic acid esters, other organic or inorganic acids such as, for example, phosphoric acid, or mixtures of the aforementioned acids and acid esters; also tertiary amines such as 1,4-diazabicyclo[2.2.2]octane, benzyldimethylamine, α-methylbenzyldimethylamine, 2-(dimethylaminomethyl)phenol or 2,4,6-tris-(dimethylaminomethyl)phenol, triethanolamine, dimethylaminopropylamine, salts of such tertiary amines, quaternary ammonium salts such as, for example, benzyltrimethylammonium chloride, as well as phosphites such as, for example, triphenyl phosphite;

rheology modifiers such as in particular thickeners, for example sheet silicates such as bentonites, derivatives of castor oil, hydrogenated castor oil, polyamides, polyurethanes, urea compounds, pyrogenic silicic acids, cellulose ethers, and hydrophobically modified polyoxyethylenes;

Adhesion promoters, for example, organoalkoxysilanes such as 3-glycidoxypropyltrimethoxysilane, 3-aminopropyltrimethoxysilane, N-(2-aminoethyl)-3-aminopropyltrimethoxysilane, N-(2-aminoethyl)-M[3-(trimethoxysilyl)propyl]ethylenediamine, 3-ureidopropyltrimethoxysilane, 3-chloropropyltrimethoxysilane, vinyltrimethoxysilane, or the corresponding organosilanes with ethoxy groups instead of methoxy groups;

heat, light, and UV radiation stabilizers;

flame retardants;

surfactants such as, for example, wetting agents, flow-control agents, degassers or defoamers;

biocides such as, for example, algicides, fungicides, or mold growth inhibitors.

The epoxy resin composition preferably has less than 5 wt. %, preferably less than 2 wt. % benzyl alcohol. The epoxy resin composition in particular is benzyl alcohol-free.

The curing agent components C1 or C11 and the resin components C2 or C22 can respectively be stored before their application in suitable packaging or devices such as, for example, in a drum, a hobbock, a bag, a bucket, a canister, a cartridge, or a tube, for a period of several months up to a year or longer, without alteration of their respective properties to an extent relevant for their use.

The mix ratio between the curing agent component C1 and the resin component C2 is preferably selected so that there is a suitable ratio between the epoxy group-reactive groups of the curing agent component C1 and the epoxy groups of the resin component C2. Before curing, 0.7 to 1.5, preferably 0.9 to 1.1 equivalents of epoxy group-active NH hydrogens are suitably present per equivalent of epoxy groups.

The mix ratio between a curing agent component C11 and a resin component C22 is preferably selected so that there is a suitable ratio between the epoxy group-reactive groups of the curing agent component C11 remaining after reaction with the diketone K1 or K2 and the epoxy groups of the resin component C22. After reaction with the diketone K1 or K2 and before curing, 0.7 to 1.5, preferably 0.9 to 1.1 equivalents of epoxy group-active NH hydrogens are suitably present per equivalent of epoxy groups.

In parts by weight, the mix ratio between the curing agent component C1 or C11 and the resin component C2 or C22 is usually in the range from 1:10 to 10:1.

Before or during application, both components are mixed together by means of a suitable method. Mixing can be done continuously or batchwise. If mixing is done before application, it must be ensured that not too much time passes between mixing of the components and the application, since this can cause problems such as, for example, slowed or incomplete development of adhesion to the substrate.

The curing reaction begins with mixing. The epoxy group-reactive NH hydrogens present in the epoxy resin composition react with the epoxy groups present, whereby the composition is then cured. Thus the present invention also describes a cured composition which is obtained by mixing the components C1 and C2 or C11 and C22 of a two-component epoxy resin composition, as described above.

Application and curing are advantageously carried out at temperatures in the range from 5° C. to 50° C.

The curing rate depends on the ambient temperature and optionally present accelerators.

During curing of the described epoxy resin composition, typically aesthetically pleasing films are formed, while compositions containing the corresponding polyamine B1 as the curing agent instead of polyamine A1 are prone to blushing effects such as hazing and tackiness. The cured film of the described epoxy resin composition is typically clear and shiny and sometimes slightly opaque, and largely tack-free.

The epoxy resin composition can be used as an adhesive, a sealing compound, a potting compound, a coating, a floor covering, paint, lacquer, primer or priming coat, where properties such as waterproofness, corrosion protection, chemical resistance and/or high hardness and toughness can come to the fore. They can be used, for example, in civil engineering, in manufacture or repair of industrial goods or consumer goods.

The epoxy resin composition is considerably less prone to surface problems during curing, such as "blushing." Blushing problems especially appear if an epoxy resin composition applied over a surface is cured at high humidity. $CO_2$ dissolved in the water can react with primary amino groups from the curing agent component to form carbonate or carbamate salts, which on the one hand alters the stoichiometry of the curing reaction and thus results in incomplete reaction of the epoxy groups, leading to a tacky surface. On the other hand, the salts formed migrate on the surface and there cause unattractive spotting and haze. The epoxy resin composition described in this document, containing at least one polyamine A1 of formula (I) or (II), has no or only a small number of primary amino groups. Thus it hardly reacts or does not react at all with $CO_2$ and therefore forms little or no carbonate and/or carbamate salts. Therefore even under humid conditions, it cures to form flat films with a clear, shiny to slightly opaque surface, largely with no "blushing", therefore with no spotting or hazing on the surface, and without any mechanical defects due to incomplete reaction of the epoxy groups. Therefore it is possible to largely or entirely avoid addition of benzyl alcohol to the described epoxy resin composition. Thus epoxy resin compositions can be obtained which have only a low content of volatile organic compounds (VOC) or are VOC-free.

It has thus been shown that the polyamine A1 described above, optionally in the form of a curing agent composition, can be used to reduce blushing of an epoxy resin composition. As a result, these epoxy resin compositions are extremely suitable for aesthetically demanding applications such as, for example, coatings, especially floor coverings.

The described epoxy resin composition is applied to at least one substrate, where the following are suitable as substrates:

glass, glass ceramic, concrete, mortar, brick, tile, plaster, and natural stones such as granite or marble;

metals or alloys such as aluminum, steel, iron, nonferrous metals, galvanized metals;

leather, textiles, paper, wood, resin-bonded wood products, resin/textile composites and other "polymer composites";

plastics such as polyvinyl chloride (hard and soft PVC), acrylonitrile/butadiene/styrene copolymers (ABS), SMC (sheet molding compounds), polycarbonate (PC), polyamide (PA), polyester, poly(methylmethacrylate) (PMMA), polyester, epoxy resins, polyurethanes (PURR), polyoxymethylene (POM), polyolefins (PO), polyethylene (PE) or polypropylene (PP), ethylene/propylene copolymers (EPM), and ethylene/propylene/diene terpolymers (EPDM), where the plastics can preferably be plasma, corona, or flame surface-treated.

coated substrates such as powder-coated metals or alloys; as well as paints and lacquers.

Before application of the epoxy resin composition, the substrates can be pretreated as needed. Such pretreatments in particular include physical and/or chemical cleaning methods, for example grinding, sand blasting, shot peening, brushing, or the like, where in the process the dust formed is advantageously vacuumed off, as well as additional treatment with cleaning agents or solvents, or applying an adhesion promoter, an adhesion promoter solution, or a primer.

EXAMPLES

1. Description of Measurement Methods

The viscosity was measured on a Rheotec RC30 cone-and-plate viscometer (cone diameter 25 mm, cone angle 1°, gap between cone tip and plate 0.05 mm, shear rate 50 s$^{-1}$). The viscosity measured at 20° C. was given as $\eta_{20°\,C.}$ in Table 1.

2. Raw Materials Used

| | |
|---|---|
| Pentaethylenehexamine (Delamine) ("PEHA") | technical grade, molecular weight approx. 232 g/mol, amine value 1220 mg KOH/g |
| Tetraethylenepentamine (Delamine) ("TEPA") | technical grade, molecular weight approx. 189 g/mol, amine value 1350 mg KOH/g |
| N4-Amine (BASF) | N,N'-bis(3-aminopropyl)ethylenediamine, molecular weight = 174 g/mol |
| Lupasol ® FG (BASF) ("PEI") | polyethyleneimine, average molecular weight 800 g/mol, primary:secondary:tertiary amino group ratio approx. 1:0.9:0.5 |
| 2,4-Pentanedione (Wacker) | molecular weight = 100 g/mol |
| 2,5-Hexanedione (Wacker) | molecular weight = 114 g/mol |

3. Preparation of Polyamines of the Polyamine A1 Type

Example 1

232 g of pentaethylenehexamine was placed under a nitrogen atmosphere at a temperature of 50° C. 200 g of 2,4-pentanedione was slowly added dropwise with good stirring. Then the water formed was driven off under vacuum at 80° C. for one hour in the rotary evaporator.

Examples 2 to 13

Examples 2 to 13 were prepared analogously to Example 1, where the ingredients were used as given in Table 1. The amounts are given in grams. Examples 4, 5, 6, 12, and 13, for which 2,5-hexanedione was used instead of 2,4-pentanedione, were left in the rotary evaporator at 80° C. for two hours in each case instead of one hour.

All resins of the polyamine A1 type in Examples 1 to 13 are clear yellow, yellow-green, or orange liquids. In Table 1, as Appearance in each case the color of the liquid is given, where "Y" means yellow, "YG" means yellow-green, "O" means orange, and "LO" means light orange. The NH-equivalent weights given in Table I are calculated.

TABLE 1

Composition and properties of Examples 1 to 13.

| Example | 1 | 2 | 3 | 4 | 5 | 6 | 7 | 8 | 9 | 10 | 11 | 12 | 13 |
|---|---|---|---|---|---|---|---|---|---|---|---|---|---|
| PEHA | 232 | 232 | 232 | 232 | 232 | 232 | — | — | — | — | — | — | — |
| TEPA | — | — | — | — | — | — | 189 | — | — | — | — | — | — |
| N4-Amine | — | — | — | — | — | — | — | 174 | 174 | — | — | — | — |
| PEI | — | — | — | — | — | — | — | — | — | 800 | 800 | 800 | 800 |
| 2,4-Pentanedione | 200 | 140 | 115.5 | — | — | — | 140 | 140 | 100 | 500 | 400 | — | — |
| 2,5-Hexanedione | — | — | — | 228 | 160 | 132.8 | — | — | — | — | — | 570 | 456 |
| $(c_{DK}/c_{NH2})^a$ | 1 | 0.7 | 0.6 | 1 | 0.7 | 0.6 | 0.7 | 0.7 | 0.5 | 0.7 | 0.5 | 0.7 | 0.5 |
| Appearance | Y | Y | Y | O | LO | Y | Y | YG | YG | Y | Y | LO | Y |
| $\eta_{20°\,C.}$ [Pa · s] | 7.2 | 2 | 1 | 12 | 5 | 2 | 2 | 0.5 | 0.4 | 42 | 24.5 | 52 | 25 |
| NH-eq [g/eq] | 99 | 66.7 | 57.6 | 97 | 65.6 | 56.8 | 72.3 | 90.3 | 64 | 103 | 82 | 101 | 80.9 |

$^a$Ratio of the number of diketones ($c_{DK}$) to the number of primary amino groups ($c_{NH2}$).

4. Preparation of Epoxy Resin Compositions

Examples 14 to 26 and Examples 27 to 30 (Comparison)

50 parts by weight of a mixture of 42 parts by weight Araldite® GY 250 (bisphenol A diglycidyl ether from Huntsman, EEW=187.5 g/eq) and 8 parts by weight Araldite® DY-E (monoglycidyl ether of a $C_{12}$ to $C_{14}$ alcohol, from Huntsman, EEW=290 g/eq) in each case were mixed with the amounts given in Table 2 (in parts by weight) of the given curing agent. A film was applied to a glass plate with the mixed composition in a 500 μm layer thickness, and this was stored for 7 days at 23° C. and 50% relative humidity, or cured. Then the appearance of the film was assessed. The film was called "defeat-free" if it was clear and had a hard, shiny, and tack-free surface with no structure. The pencil hardness (Wolff-Wilborn scratch hardness, measured according to ISO 15184) of the film was also determined. After storage for 6 months at 23° C. and 50% relative humidity, for the films which were not tacky, the König pendulum hardness was determined according to DIN EN ISO 1522 and indicated as "König hardness" in the tables.

The results are given in Table 2.

From Table 2, it is apparent that the Examples according to the invention, 14 to 26, which contain polyamines as curing agents that are reacted with diketones in different ratios, definitely exhibit less blushing than Comparison Examples 27 to 30 with the corresponding polyamines not reacted with diketones. It is also apparent that Example 14 gave a more attractive film compared with Examples 15 and 16. The curing agent contained in Example 14 is largely free of primary amino groups, while the curing agents contained in Examples 15 and 16 are reacted with 2,4-pentanedione in substoichiometric ratio relative to the primary amino groups and thus still contain primary amino groups. Also Examples 19 to 22, which did give films with definitely reduced blushing but after storage for 2 months had a coating on the surface, contained curing agents with a substoichiometric extent of reaction of the diketones relative to the primary amino groups.

5. Preparation of Epoxy Resin Compositions with In-Situ Method

Examples 31 to 42 and Comparison Examples 43 and 44

The amounts given in Table 3 (in parts by weight) of the given substances in each case were mixed with a curing agent

TABLE 2

Composition and properties of Examples 14 to 26 and Comparison Examples 27 to 30.

| Example | Curing agent, amount | Appearance | Pencil hardness | König hardness |
|---|---|---|---|---|
| 14 | Example 1, 24.9 | almost defect-free (very slightly opaque) | 4H-5H | 165 s |
| 15 | Example 2, 16.8 | almost defect-free (very slightly opaque) * | 4H-5H | |
| 16 | Example 3, 14.5 | almost defect-free (very slightly opaque) * | 3H-4H | |
| 17 | Example 4, 24.4 | defect-free | 4H-5H | 220 s |
| 18 | Example 5, 16.5 | defect-free | 4H-5H | 200 s |
| 19 | Example 6, 14.3 | slightly opaque, tacky * | 3H-4H | |
| 20 | Example 7, 18.2 | slightly opaque, slightly tacky * | 3H-4H | |
| 21 | Example 8, 22.7 | almost defect-free (very slightly opaque) * | 2H-3H | |
| 22 | Example 9, 16.1 | slightly opaque, slightly tacky * | H-2H | |
| 23 | Example 10, 25.9 | almost defect-free (slight structure) | 6H-7H | 170 s |
| 24 | Example 11, 20.6 | almost defect-free (slight structure) | 6H-7H | 180 s |
| 25 | Example 12, 25.4 | defect-free | 7H-8H | 220 s |
| 26 | Example 13, 20.4 | almost defect-free (very slightly opaque) | 6H-7H | 165 s |
| 27 (Cmp.) | PEHA, 7.3 | dull, considerable structure, slightly tacky * | 4H-5H | |
| 28 (Cmp.) | TEPA, 6.8 | dull, considerable structure, slightly tacky * | 3H-4H | |
| 29 (Cmp.) | N4-Amine, 7.3 | dull, considerable structure, tacky * | HB-H | |
| 30 (Cmp.) | Lupasol FG, 9.2 | dull, considerable structure, tacky * | <HB | |

* After 2 months, a greasy coating had formed on the surface.

or a resin component, and both components were then mixed together. A film was applied to a glass plate with the mixed composition in a 500 μm layer thickness, and its appearance was assessed as described in Example 14. The König pendulum hardness was determined after 28 days of storage at 23° C. and 50% relative humidity in the same way as described in Example 14.

Abbreviations used in Table 3:

"D-230" Jeffamine® D-230 (polyoxypropylenediamine with average molecular weight of 240 g/mol, from Huntsman), "IPDA" isophoronediamine (molecular weight=170 g/mol), "GY-250" Araldite® GY 250 (bisphenol A diglycidyl ether, from Huntsman, EEW=187.5 g/eq), "DY-E" Araldite® DY-E (monoglycidyl ether of a $C_{12}$ to $C_{14}$ alcohol, from Huntsman, EEW=290 g/eq), "TEPA Adduce" adduct of 37.58 parts by weight TEPA and 12.43 parts by weight Araldite® GY 250, which theoretically has a content of primary amino groups of 150.9 g/eq and an NH-equivalent weight of 37.7 g, "PEHA Adduce" adduct of 39.39 parts by weight PEHA and 10.61 parts by weight Araldite® GY 250, which theoretically has a content of primary amino groups of 176.7 g/eq and an NH-equivalent weight of 38.4 g, and "DETA" diethylenetriamine

TABLE 3

Composition of Examples 31 to 42 and Comparison Examples 43 and 44.

| Example | 31 | 32 | 33 | 34 | 35 | 36 | 37 | 38 | 39 | 40 | 41 | 42 | 43 (Cmp.) | 44 (Cmp.) |
|---|---|---|---|---|---|---|---|---|---|---|---|---|---|---|
| Curing agent components | | | | | | | | | | | | | | |
| PEHA | 14.6 | 14.6 | — | — | 7.3 | 13.1 | 13.1 | 11.7 | — | — | — | — | — | — |
| PEI | — | — | 17.1 | 17.1 | 8.5 | — | — | — | 12.8 | 12.8 | — | — | — | — |
| D230 | — | — | — | — | — | — | — | 3.0 | 3.8 | — | — | — | — | — |
| IPDA | — | — | — | — | — | 1.1 | — | — | — | — | 2.7 | — | — | — |
| MXDA | — | — | — | — | — | — | 0.9 | — | — | — | — | — | — | — |
| TEPA-Adduct | — | — | — | — | — | — | — | — | — | — | — | 19.0 | 9.5 | — |
| PEHA-Adduct | — | — | — | — | — | — | — | — | — | — | 17.1 | — | — | — |
| DETA | — | — | — | — | — | — | — | — | — | — | — | — | — | 8.6 |
| Resin components: | | | | | | | | | | | | | | |
| GY-250 | 42.0 | 42.0 | 42.0 | 42.0 | 42.0 | 42.0 | 42.0 | 42.0 | 42.0 | 42.0 | 42.0 | 42.0 | 42.0 | 42.0 |
| DY-E | 8.0 | 8.0 | 8.0 | 8.0 | 8.0 | 8.0 | 8.0 | 8.0 | 8.0 | 8.0 | 8.0 | 8.0 | 8.0 | 8.0 |
| 2,4-Pentanedione | 12.6 | — | 10.7 | — | 11.6 | 11.3 | 11.3 | 10.1 | 8.0 | 8.0 | 9.7 | 12.6 | — | 8.4 |
| 2,5-Hexanedione | — | 14.3 | — | 12.2 | — | — | — | — | — | — | — | — | — | — |

"Cmp." stands for "Comparison."

The results are given in Table 4.

TABLE 4

Properties of Examples 31 to 42 and Comparison Examples 43 and 44.

| Example | Appearance | König hardness |
|---|---|---|
| 31 | defect-free | 178 s |
| 32 | clear, shiny, and tack-free surface with structure (orange skin) | 170 s |
| 33 | defect-free | 185 s |
| 34 | defect-free | 200 s |
| 35 | defect-free | 180 s |
| 36 | almost defect-free (fine celled marking on surface) | 179 s |
| 37 | almost defect-free (fine celled marking on surface) | 175 s |
| 38 | almost defect-free (fine celled marking on surface) | 179 s |
| 39 | almost defect-free (slight streaking on surface) | 170 s |
| 40 | defect-free | 195 s |
| 41 | almost defect-free (fine celled marking on surface) | 189 s |
| 42 | almost defect-free (very fine structure on surface) | 192 s |
| 43 (Cmp.) | hazy, dull, considerable structure, tacky | ND |
| 44 (Cmp.) | cloudy/hazy, fine blisters | 93 s |

"ND" stands for "not determined" (too tacky).
"Cmp." stands for "Comparison."

From Examples 31 to 42, it is apparent that with the in-situ method, films are formed with definitely reduced blushing compared with Comparison Examples 27 to 30 and 43. Examples 31 to 34 correspond to Examples 14, 17, 23, and 25, but with the in-situ method. Obviously for mixing with PEHA or PEI, the corresponding polyamine A1 is preferentially formed before the primary amino groups react with epoxy groups to an appreciable extent, since the films have an appearance with attractiveness comparable to the corresponding Examples 14, 17, 23, and 25; sometimes they are even somewhat more attractive. Examples 36 to 42 show that the in-situ method also gives good films with curing agent compositions in which mixtures of polyamines B1 and B2 or mixtures of polyamines B1 and adducts of polyamines B1 with epoxy resins are present. In Comparison Example 44, DETA was reacted with the diketone in situ in 1:1 mole ratio. This polyamine has, besides an acyl enamino group, only one secondary and one primary amino group. The concentration of primary amino groups in the curing agent is therefore relatively high. Accordingly, a hazy, relatively soft film is formed with definite blushing.

The invention claimed is:

1. Polyamine A1 of formula (I) or (II)

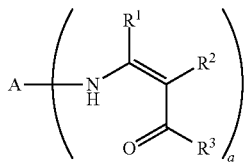

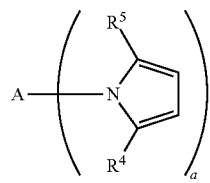

wherein
a stands for an integer from 2 to 100;
A stands for an a-valent radical of a polyamine B1 after removal of a primary amino groups, wherein the a-valent radical has at least 3 amino groups that are secondary or primary amino groups and a number of the secondary amino groups is greater than a number of the primary amino groups;
either
$R^1$ and $R^3$ each independently stands for an alkyl, cycloalkyl, aryl, or arylalkyl group with 1 to 12 C atoms, the alkyl, cycloalkyl, aryl, or arylalkyl group with 1 to 12 C atoms optionally having ether groups or halogen atoms, and
$R^2$ stands for a hydrogen atom or for an alkyl, cycloalkyl, aryl, or arylalkyl group with 1 to 12 C atoms;
or
$R^2$ and $R^1$ together stands for a divalent hydrocarbon radical that is part of a carbocyclic ring with 5 to 8 C atoms, or $R^2$ and $R^1$ together stands for a divalent hydrocarbon radical that is part of a substituted carbocyclic ring with 5 to 8 C atoms, and
$R^3$ stands for an alkyl, cycloalkyl, aryl, or arylalkyl group with 1 to 12 C atoms, the alkyl, cycloalkyl, aryl, or arylalkyl group with 1 to 12 C atoms optionally having ether groups or halogen atoms;
or
$R^2$ and $R^3$ together stands for a divalent hydrocarbon radical that is part of a carbocyclic ring with 5 to 8 C atoms, or $R^2$ and $R^3$ together stands for a divalent hydrocarbon radical that is part of a substituted carbocyclic ring with 5 to 8 C atoms, and
$R^1$ stands for an alkyl, cycloalkyl, aryl, or arylalkyl group with 1 to 12 C atoms, the alkyl, cycloalkyl, aryl, or arylalkyl group with 1 to 12 C optionally having ether groups or halogen atoms;
and
$R^4$ and $R^5$ each independently stands for an alkyl, cycloalkyl, aryl, or arylalkyl group with 1 to 12 C atoms, the alkyl, cycloalkyl, aryl, or arylalkyl group with 1 to 12 C optionally having ether groups or halogen atoms.

2. Polyamine A1 as in claim 1, wherein the subscript a in formulas (I) and (II) stands for 2 to 10.

3. Polyamine A1 as in claim 1, wherein the polyamine B1 is selected from the group consisting of tetraethylenepentamine, pentaethylenehexamine, polyethylene polyamine with 5 to 7 ethyleneamine units, and polyethyleneimine with an average molecular weight from 500 to 2500 g/mol.

4. Polyamine A1 as in claim 1, wherein $R^1$ and $R^3$ each stands for a methyl group.

5. Polyamine A1 as in claim 1, wherein $R^2$ stands for a hydrogen atom.

6. Method for preparation of a polyamine A1 of formula (I) or (II) as in claim 1, wherein at least one polyamine B1 of formula (III) is reacted with at least one diketone K1 of formula (IV) or a diketone K2 of formula (V)

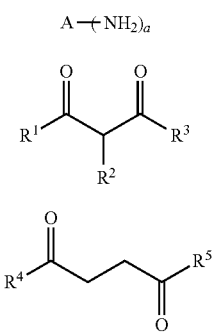

where the diketone K1 or K2 is used in either stoichiometric or substoichiometric ratio relative to the primary amino groups of the polyamine, and the $R^1$ to $R^5$ are as defined in claim 1.

7. Method as in claim 6, wherein the diketone K1 is selected from the group consisting of 2,4-pentanedione, 3-methyl-, 3-ethyl-, 3-propyl-, 3-isopropyl-, 3-butyl-, 3-tert-butyl-, 3-cyclohexyl-, and 3-phenyl-2,4-pentanedione, 3,5-heptanedione, 6-methyl-3,5-heptanedione, 2,2,6,6-tetramethyl-3,5-heptanedione, 2,2,4,6,6-pentamethyl-3,5-heptanedione, 2-acetylcyclopentanone, and 2-acetylcyclohexanone.

8. Method for preparation of a polyamine A1 of formula (I) as in claim 1, wherein at least one polyamine B1 of formula (III) is reacted with at least one ketone of formula (IV a),

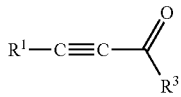

where the ketone of formula (IV a) is used in either stoichiometric or substoichiometric ratio relative to the primary amino groups of the polyamine.

9. Method as in claim 6, wherein the polyamine B1 is selected from the group consisting of tetraethylenepentamine, pentaethylenehexamine, polyethylene polyamine with 5 to 7 ethyleneamine units, and polyethyleneimine with an average molecular weight from 500 to 2500 g/mol.

10. Curing agent composition containing
(a) at least one polyamine A1 of formula (I) or (II) as in claim 1, and
(b) at least one polyamine B2 with at least two amino groups that are primary or secondary amino groups.

11. Curing agent composition as in claim 10, wherein the polyamine B2 is selected from the group consisting of 1,5- diamino-2-methylpentane (MPMD), 2-butyl-2-ethyl-1,5-pentanediamine (C11-neodiamine), 2,2,4- and 2,4,4-trimethylhexamethylenediamine (TMD), bis(4-amino-3-methylcyclohexyl)methane, 1-amino-3-aminomethyl-3,5,5-trimethylcyclohexane (=isophoronediamine or IPDA), 1,3-bis(aminomethyl)cyclohexane, 3(4),8(9)-bis(aminomethyl)tricyclo[$5.2.1.0^{2,6}$]decane 1,3-xylylenediamine, diethylenetriamine (DETA), dipropylenetriamine (DPTA), and an ether group-containing diamine derived from amination of a polyoxyalkylene diol with a molecular weight from 500 to 5000 g/mol.

12. Two-component epoxy resin composition, comprising a curing agent component C1 or C11 and a resin component C2 or C22, wherein:
the curing agent component C1 or C11 contains at least one polyamine A1 of formula (I) or (II), as in claim 5; and
the resin component C2 or C22 contains at least one epoxy resin.

13. Two-component epoxy resin composition as in claim 12, wherein the composition has less than 5 wt. % benzyl alcohol.

14. Cured composition that is obtained by mixing the two components C1 and C2, or C11 and C22, of a two-component epoxy resin composition as in claim 12.

15. A floor coating composition comprising a two-component epoxy resin composition as in claim 12.

16. A method of reducing blushing of an epoxy resin composition, comprising adding a polyamine A1 as in claim 1 to the epoxy resin composition.

17. Method as in claim 8, wherein the polyamine B1 is selected from the group consisting of tetraethylenepentamine, pentaethylenehexamine, polyethylene polyamine with 5 to 7 ethyleneamine units, and polyethyleneimine with an average molecular weight from 500 to 2500 g/mol.

* * * * *